United States Patent Office 2,754,283
Patented July 10, 1956

2,754,283

POLYMERIZATION OF ANACARDIC MATERIALS USING SULFONIC ACID CATALYSTS

Solomon Caplan, New York, N. Y., assignor, by mesne assignments, to The Harvel Corporation, a corporation of New Jersey No Drawing. Application November 6, 1952,
Serial No. 319,183

9 Claims. (Cl. 260—46)

This invention relates to novel compositions of matter and to methods for making them and also to articles of manufacture employing one or more of said compositions as components thereof. In one of its more specific aspects, the invention is directed to novel methods for producing reaction products of certain anacardic materials and to such reaction products themselves. The anacardic materials with which this invention is concerned are cashew nut shell liquid, and also distillates and normally liquid residues thereof. More specifically, the invention is directed to methods for polymerizing said anacardic materials, to polymers so produced, and also to products produced by reacting such polymers with a reagent containing a reactive methylene group.

The cashew nut shell liquid may be the raw cashew nut shell liquid obtained by the solvent extraction of said liquid from the cashew nuts or by the extraction of said liquid from said nuts by the use of a hot cashew nut shell liquid bath as set forth in the United States patent to E. R. Hughes, No. 2,058,456 issued October 27, 1946, or it may be the so-called treated cashew nut shell liquid obtained after the raw cashew nut shell liquid has been treated to reduce its vesicant action and to remove the naturally occurring metals therein as set forth in the United States patents to Harvey e al., No. 2,046,919 of January 19, 1937 and No. 2,128,247 of August 30, 1938. Such treated cashew nut shell liquid in commercial practice generally has a viscosity higher than that of the raw cashew nut shell liquid and its viscosity characteristic may be up to about 1,500 centipoises at 25° C. The cashew nut shell liquid also may be another type of so-called treated cashew nut shell liquid which is made according to the method set forth in the United States Patent No. 2,559,593 issued to me on July 10, 1951, or it may be either raw or treated cashew nut shell liquid however obtained and which has been steam-distilled or distilled under vacuum or other conditions at temperatures of about 500–600° F. to remove the more volatile constituents measuring up to 10% by weight of the cashew nut shell liquid treated. It is preferable that the cashew nut shell liquid which is employed in the practice of this invention be of the substantially completely decarboxylated type and from which there has been removed the nitrogenous and metal components naturally occurring therein, and customarily referred to in the art as treated cashew nut shell liquid.

The distillates and residues from cashew nut shell liquid may be obtained by heat distilling said cashew nut shell liquid in any convenient manner. In commercial practice, it is preferable that the cashew nut shell liquid be either gas or vapor and, for example, steam-distilled at about 600–700° F. or distilled under subatmospheric pressure conditions and preferably below about 50 mm. of mercury pressure and temperatures between 400–700° F. When distilled under reduced pressure of about 50 mm. of mercury, it is preferable to employ temperatures of 525–700° F., and when distilled under reduced pressure of about 10 mm. of mercury a temperature of approximately 450° F. is employed. By whatever method employed, the distillation is continued until the quantity by weight of the distillate is between 25% to 75% of the quantity by weight of the cashew nut shell liquid. The distillates thus obtained for the most part consist of a phenol having an unsaturated hydrocarbon substituent of 15 carbon atoms and having a boiling point of approximately 225° C. at 10 mm. of mercury pressure. Of these distillates, it is preferable to employ those produced by vacuum distillation, thus eliminating the use of steam or the like. The residues which are to be used in the practice of this invention are those which are liquid at room temperature and by liquid I means that they may vary in consistency or viscosity from thin, readily pourable liquids to so-called "plastic solids" exhibiting cold flow and being readily pourable at 300° F.

Prior to this invention, these anacardic materials had been polymerized to such a degree that the viscosities thereof at 25° C. measured at least about five times that of the material being polymerized. The agent generally employed for effecting such polymerization was either a strong mineral acid such as sulphuric acid, hydrochloric acid or an alkyl ester such as diethyl sulphate. These agents have been used for polymerization for many years. The mineral acids have been found somewhat deficient because they are only slightly miscible with the anacardic materials and consequently have produced local action resulting in non-homogeneous compositions. Because of this, it has been proposed to employ alcohol solutions of sulphuric acid. This was also never entirely satisfactory because upon heating the mixture of the alcohol solution of sulphuric acid and anacardic material ethers of the alcohol and anacardic material are produced. The diethyl sulphate like the alcohol solutions of sulphuric acid also has the same tendency to form small amounts of ethers of the anacardic material and in this instance the ethyl ether. Since these ethers do not react with formaldehyde, the polymers of the anacardic materials containing them when used as a component in brake linings, for example, ooze out of the brake lining when the temperature of the brake lining is elevated in the normal course of its operation.

This invention was made in order to obviate the foregoing disadvantages. According to this invention, the polymerization of said anacardic materials is effected by heating a mixture of (I) one or more of said liquid anacardic materials and (II) one or more sulfonic acids of hydroxybenzene, cresols, xylenols, naphthols, resorcinol, catechol, hydrogenated cardanol, hydrogenated cardol and monoethylenic cardanol ($C_6H_4OHC_{15}H_{29}$). The various polymerizing agents (II) all have one or more sulfonic acid groups on their nucleii and are all miscible with said materials (I). The mole ratio of (I) to (II) is 100 moles of (I) to 1–15 moles of (II) and such masses are heated to and maintained at temperatures of approximately 250–400° F. until the viscosity thereof measured at 25° C. has increased at least four fold. In other words, the heating is continued until the viscosity of the mass measured at 25° C. is at least five times that of material (I) or the original mass before heating.

The resultant polymerized mass finds utility in all of the various fields in which were used the polymers of said anacardic materials when diethyl sulphate or sulphuric acid was used as the polymerizing agent. One of the prime utility of the novel polymerized masses is in the field of electrical insulation and the brake lining and clutch facing field. The novel polymerized mass when in the liquid state or in the state where it is liquid at 300° F. may also be heat reacted at 250–350° F. with an aldehyde agent to convert it to the substantially infusible state if desired. By "aldehyde" I mean to include aldehydes as well as aldehyde donors, such as hexamethylene tetramine, etc. Among such agents which may be employed for this purpose are hexamethylene tetramine, formaldehyde, paraformaldehyde, trioxane, glyoxal, polymerized glyoxal, furfuraldehyde, acrolein, polymerized acrolein, acetaldehyde, mesityl oxide, etc. The quantity of said agent employed may vary but in general measures from 5-50 parts thereof to 1000 parts of said polymerized mass. Such reaction products also find utility in the fields of electrical insulation, brake linings and other fields as impregnants, binders and also as friction fortifying dusts.

The following examples are given merely by way of illustrating the novel products which may be produced by following the teachings of this invention, all parts being given by weight unless otherwise specifically set forth.

Example I 100 parts of treated cashew nut shell liquid having a viscosity of about 400 centipoises at 25° C. were mixed with two parts of phenol sulfonic acid to dissolve one into the other. The resultant solution was heated to 350° F. and held at that temperature until the viscosity of a sample diluted with an equal volume of xylene provided a solution having a viscosity at 25° C. of 175-200 centipoises. The viscosity of a solution of a sample dissolved in xylene is the easier and more preferable way of determining the viscosity of the polymerized mass because such a mass without the solvent-diluent would have a high viscosity of around 5,000-10,000 centipoises at 25° C. This novel mass will hereinafter be called product A.

Product A may be further polymerized to further increase its viscosity and may be converted to the substantially solid or rubbery and infusible state. For this purpose there may be added 3 parts of phenol sulfonic acid to 100 parts of product A, the phenol sulfonic acid being miscible therewith. Then the mass is poured into shallow pans and maintained in an oven at about 300° F. for about 16-24 hours. At the end of that period the mass will be found to have converted to the substantially solid, rubbery and infusible state. This rubbery mass, hereinafter known as product B, may be milled with rubber, for example, and employed as a component of brake linings and clutch facings and for other purposes as well.

Product A may be reacted with one or more of said reagents containing a reactive methylene group to provide resinous reaction products either in the intermediate or in the substantially solid and infusible state. For example, 100 parts of product A may be mixed with 3 parts of paraformaldehyde. The mixture may be heated at about 300° F. whereupon reaction takes place and the reaction mass before it has reached the infusible state is cooled. This reaction product in the intermediate state may be employed as an impregnant and coating for asbestos brake lining material which may be composed of asbestos in the form of a mat or woven fabric containing other desirable materials such as barytes, rubber, etc. Then under pressure, if desired, and at elevated temperatures of about 400° F., the asbestos impregnated material is cured whereupon the resinous reaction product is converted to the substantially solid and infusible state. In the course of the reaction with the reactive methylene containing agent, both the polymerized cashew nut shell liquid as well as the phenol sulfonic acid have reacted with such agent to produce a substantially hard, dry and infusible mass which acts therein as a friction fortifier and also as a binder. Moreover, such friction elements are free of compounds which may exude, such as ethers of cashew nut shell liquid which may be formed if diethyl sulphate were employed as the polymerizing agent in place of the phenol sulfonic acid. Instead of carrying out this reaction to the intermediate state and then impregnating the asbestos material therewith and subsequently converting the resinous material to the infusible state, the mix of product A together with the reactive methylene group containing agent before any reaction may be used as the impregnant for the asbestos material as above set forth and then the combination may be treated as before to cause the product A-agent reaction in a single step to convert the mix to the substantially solid and infusible state. When desired, product A and the agent in the proportions heretofore set forth may be poured directly into shallow pans, placed in an oven at 300-350° F. for about 16 hours. At the end of that period the mass will be found to have converted to the substantially solid and infusible state and this mass may be ground into very fine particles in the nature of a dust which may be employed as discrete particles in the binder of a brake lining or clutch facing.

Example II 100 parts of cardanol having a viscosity of approximately 40 centipoises at 25° C. were mixed with 3 parts of meta-para cresol sulfonic acid or otho cresol sulfonic acid and the resultant solution is heated at about 325° F. until the viscosity thereof at 25° C. was approximately 3,000 centipoises. This product, hereinafter known as product C, was reacted with an aldehyde agent, and in this example, 10 parts of glyoxal were used, employing the same procedures as those set forth in Example I to produce the same type of reaction products and also to produce brake lining and friction fortifying dusts as set forth in Example I.

Example III 100 parts of residue of cashew nut shell liquid having a viscosity of about 3,000 centipoises at 25° C. together with 2 parts of 1,4,2 xylenol sulfonic acid were heated at 300° F. until the viscosity of the mass at 25° C. was approximately 25,000 centipoises, and this mass will hereinafter be known as product D. By heating product D with or without the addition of additional xylenol sulfonic acid, the partially polymerized product may be converted to the substantially solid and infusible state by maintaining the mass in an oven for about 16 hours at 300° F. Product D may be used in the same manner as product A of Example I and in this case, for example, furfuraldehyde may be employed as the reagent containing the reactive methylene group.

Example IV

Employing the same procedure as that set forth in Example I and substituting 5 parts of either hydrogenated cardanol sulfonic acid, hydrogenated cardol sulfonic acid or monoethylenic cardanol sulfonic acid, I have produced novel products. The hydrogenated cardol and cardanol from which the sulfonic acid derivatives are formed respectively have the following formulae, $C_6H_4OHC_{15}H_{31}$ and $C_6H_3(OH)_2C_{15}H_{31}$.

All of the polymeric masses, illustrative examples of which are found in the foregoing examples, and all of the various reaction products thereof with a reagent containing a reactive methylene group may be employed for the same purposes and in the same fields in which polymeric cashew nut shell liquid, distillates and residues produced by polymerization with a mineral acid or an alkyl sulfate as well as the reaction products thereof have been heretofore used and employed.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language might be said to fall therebetween, and that they are intended to be inclusive in scope and not exclusive in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

I claim:

1. The method homopolymerizing (I) comprising heating in the temperature range of 250–400° F. a mass comprising said (I) an anacardic material selected from the group consisting of cashew nut shell liquid, distillates of cashew nut shell liquid, said distillate having a boiling point of approximately 225° C. at 10 mm. of mercury pressure and liquid residues of cashew nut shell liquid, said residues produced by heating cashew nut shell liquid until the weight of the residue measures 25–75% of the weight of the cashew nut shell liquid, and (II) a sulfonic acid selected from the group consisting of the sulfonic acids of hydroxybenzene, cresols, xylenols, naphthols, resorcinol, catechol, hydrogenated cardanol, hydrogenated cardol and monoethylenically unsaturated cardanol, the mole ratio of (I) to (II) in said mass being 100 moles of (I) to 1–15 moles of (II), the heating being continued until the viscosity of said mass measured at 25° C. increased at least four fold.

2. A product produced by the method of claim 1.

3. The method comprising heat reacting an aldehyde with a mass, liquid at 300° F., and produced according to claim 1.

4. A product produced by heat reacting an aldehyde with a mass, liquid at 300° F., and produced according to claim 1.

5. The method homopolymerizing (I) comprising heating in the temperature range of 250–400° F. a mass comprising said (I) an anacardic material selected from the group consisting of cashew nut shell liquid, distillates of cashew nut shell liquid, said distillate having a boiling point of approximately 225° C. at 10 mm. of mercury pressure, and liquid residues of cashew nut shell liquid, said residues produced by heating cashew nut shell liquid until the weight of the residue measures 25–75% of the weight of the cashew nut shell liquid, and (II) hydroxybenzene sulfonic acid, the mole ratio of (I) to (II) in said mass being 100 moles of (I) to 1–15 moles of (II), the heating being continued until the viscosity of said mass measured at 25° C. increased at least four fold.

6. The method homopolymerizing (I) comprising heating in the temperature range of 250–400° F. a mass comprising said (I) an anacardic material selected from the group consisting of cashew nut shell liquid, distillates of cashew nut shell liquid, said distillate having a boiling point of approximately 225° C. at 10 mm. of mercury pressure, and liquid residues of cashew nut shell liquid, said residues produced by heating cashew nut shell liquid until the weight of the residue measures 25–75% of the weight of the cashew nut shell liquid, and (II) cresol sulfonic acid, the mole ratio of (I) to (II) in said mass being 100 moles of (I) to 1–15 moles of (II), the heating being continued until the viscosity of the mass measured at 25° C. increased at least four fold.

7. The method homopolymerizing (I) comprising heating in the temperature range of 250–400° F. a mass comprising said (I) an anacardic material selected from the group consisting of cashew nut shell liquid, distillates of cashew nut shell liquid, said distillate having a boiling point of approximately 225° C. at 10 mm. of mercury pressure and liquid residues of cashew nut shell liquid, said residues produced by heating cashew nut shell liquid until the weight of the residue measures 25–75% of the weight of the cashew nut liquid, and (II) xylenol sulfonic acid, the mole ratio of (I) to (II) in said mass being 100 moles of (I) to 1–15 moles of (II), the heating being continued until the viscosity of said mass measured at 25° C. increased at least four fold.

8. The method homopolymerizing (I) comprising heating in the temperature range of 250–400° F. a mass comprising said (I) an anacardic material selected from the group consisting of cashew nut shell liquid, distillates of cashew nut shell liquid, said distillate having a boiling point of approximately 225° C. at 10 mm. of mercury pressure and liquid residues of cashew nut shell liquid, said residues produced by heating cashew nut shell liquid until the weight of the residue measures 25–75% of the weight of the cashew nut liquid, and (II) hydrogenated cardanol sulfonic acid, the mole ratio of (I) to (II) in said mass being 100 moles of (I) to 1–15 moles of (II), the heating being continued until the viscosity of said mass measured at 25° C. increased at least four fold.

9. The method homopolymerizing (I) comprising heating in the temperature range of 250–400° F. a mass comprising said (I) cashew nut shell liquid and (II) hydroxybenzene sulfonic acid, the mole ratio of (I) to (II) in said mass being 100 moles of (I) to 1–15 moles of (II), the heating being continued until the viscosity of said mass measured at 25° C. increased at least four fold.

References Cited in the file of this patent

UNITED STATES PATENTS

| | | |
|---|---|---|
| 2,317,116 | Sheridan | Apr. 20, 1943 |
| 2,341,115 | Novotny | Feb. 8, 1944 |
| 2,415,347 | Freund | Feb. 4, 1947 |